(12) United States Patent
Urzhumov

(10) Patent No.: US 11,067,687 B2
(45) Date of Patent: Jul. 20, 2021

(54) MULTIPATH ACOUSTIC HOLOGRAPHY AND VIRTUAL HAPTICS

(71) Applicant: Elwha LLC, Bellevue, WA (US)

(72) Inventor: Yaroslav A. Urzhumov, Bellevue, WA (US)

(73) Assignee: Elwha, LLC, Bellevue, WA (US)

( * ) Notice: Subject to any disclaimer, the term of this patent is extended or adjusted under 35 U.S.C. 154(b) by 270 days.

(21) Appl. No.: 16/394,821

(22) Filed: Apr. 25, 2019

(65) Prior Publication Data
US 2020/0341141 A1   Oct. 29, 2020

(51) Int. Cl.
G01S 15/89   (2006.01)
G01S 15/08   (2006.01)

(52) U.S. Cl.
CPC .......... *G01S 15/897* (2013.01); *G01S 15/08* (2013.01); *G01S 15/8968* (2013.01); *G01S 15/8993* (2013.01)

(58) Field of Classification Search
CPC .... G01S 15/897; G01S 15/08; G01S 15/8993; G01S 15/8968; G01S 15/89; G03H 3/00
See application file for complete search history.

(56) References Cited

U.S. PATENT DOCUMENTS

| | | |
|---|---|---|
| 6,751,322 B1 | 6/2004 | Carlbom et al. |
| 8,009,022 B2 | 8/2011 | Kipman |
| 8,743,072 B2 | 6/2014 | Kim |
| 8,746,398 B2 | 6/2014 | Neogi et al. |
| 8,842,919 B2 | 9/2014 | Katz |
| 9,058,798 B2 | 6/2015 | Waler et al. |
| 9,600,083 B2 | 3/2017 | Levesque |
| 9,958,943 B2 | 5/2018 | Long et al. |
| 10,403,084 B2 | 9/2019 | Froy |
| 10,477,298 B2 | 11/2019 | Cruz-Hernandez |
| 10,481,697 B2 | 11/2019 | Wakuda |
| 10,496,170 B2 | 12/2019 | Vartanian |

(Continued)

FOREIGN PATENT DOCUMENTS

| | | | |
|---|---|---|---|
| WO | WO2018-039455 A1 | 3/2018 | |
| WO | WO2018-146489 A1 | 8/2018 | |
| WO | WO-2020219649 A1 * | 10/2020 | ......... G01S 15/8993 |

OTHER PUBLICATIONS

J. B. Pendry et al, "Magnetism from conductors and enhanced nonlinear phenomena," IEEE Trans. Micro. Theo. Tech. vol. 47, No. 11, 1999, pp. 2075-2084.

(Continued)

*Primary Examiner* — Daniel Pihulic

(57) ABSTRACT

According to various embodiments, systems and methods for transmitting acoustic waves in a region aided by reflection from environmental objects. An arrangement of acoustically reflective surfaces in an environment of a target can be detected to generate an environmental acoustic propagation channel model. An acoustic radiation pattern for reflecting one or more acoustic waves off of one or more acoustically reflective surfaces in the arrangement of acoustically reflective surfaces towards the target can be identified. A coherent acoustic beamforming device can be controlled to perform coherent beamforming of an acoustic hologram based on the acoustic radiation pattern to generate the one or more acoustic waves for reflection towards the target off of the one or more acoustically reflective surfaces.

43 Claims, 8 Drawing Sheets

(56) References Cited

U.S. PATENT DOCUMENTS

| | | | |
|---|---|---|---|
| 10,558,271 | B2 | 2/2020 | Wakuda |
| 10,916,107 | B1* | 2/2021 | Urzhumov ............... G08B 6/00 |
| 2015/0192995 | A1 | 7/2015 | Subramanian et al. |
| 2016/0124080 | A1 | 5/2016 | Carter et al. |
| 2016/0246374 | A1 | 8/2016 | Carter et al. |
| 2016/0249150 | A1 | 8/2016 | Carter et al. |
| 2017/0193768 | A1 | 7/2017 | Long et al. |
| 2018/0039333 | A1 | 2/2018 | Carter et al. |
| 2018/0047259 | A1 | 2/2018 | Carter et al. |
| 2018/0151035 | A1 | 5/2018 | Maalouf et al. |
| 2018/0336877 | A1 | 11/2018 | Urzhummov |
| 2019/0227631 | A1 | 7/2019 | Marti et al. |
| 2020/0341141 | A1* | 10/2020 | Urzhumov ............ G01S 15/897 |
| 2021/0035420 | A1* | 2/2021 | Urzhumov ............... G08B 6/00 |

OTHER PUBLICATIONS

G. Dewar, "A thin wire array and magnetic host structure with n<0," J. Appl. Phys. 97, 2005, American Institute of Physics, pp. 10Q101-1-10Q101-3.

A. Salandrino et al., "Far-field subdiffraction optical microscopy using metamaterial crystals: Theory and simulations," Phys. Rev. B, 74(7), 2006, pp. 075103-1-075103-5.

Z. Jacob et al, "Optical hyperlens: Far-field imaging beyond the diffraction limit," Opt. Exp., vol. 14, No. 18, 2006, pp. 8247-8256.

S. Linden et al, "Photonic metamaterials: Magnetism at optical frequencies," IEEE J. Select. Top. Quant. Elect., vol. 12, No. 6, 2006, pp. 1097-1105.

V. Shalaev, "Optical negative-index metamaterials," Nature Photonics, 1, 2007, pp. 41-48.

A. J. Hoffman, "Negative refraction in semiconductor metamaterials," Nature Materials 6, Nature Publishing Group, 2007, pp. 946-950.

A. Baz, "An Active Acoustic Metamaterial With Tunable Effective Density," Journal of Vibration and Acoustics, Aug. 2010, vol. 132, pp. 041011-1-041011-9.

L. Airoldi et al., "Design of tunable acoustic metamaterials through periodic arrays of resonant shunted piezos," New Journal of Physics, 13 (2011), pp. 1-21.

G. Kim et al., "Helmholtz resonance in a piezoelectric-hydraulic pump-based hybrid actuator," Smart Materials and Structures, 20 (2011), IOP Publishing, pp. 1-8.

P. Wang et al., "Harnessing Buckling to Design Tunable Locally Resonant Acoustic Metamaterials," Physical Review Letters, Jul. 2014, PRL 113, pp. 014301-1-014301-5.

B. Popa et al., "Active acoustic metamaterials reconfigurable in real time," Physical Review, American Physical Society, 2015, 91(22), pp. 220303-1-220303-5.

J. Cheer et al., "Feedforward control of sound transmission using an active acoustic metamaterial," Smart Materials and Structures, 26, 2017, IOP Publishing, pp. 1-12.

J. Xia et. al, "Broadband Tunable Acoustic Asymmetric Focusing Lens from Dual-Layer Metasurfaces," Physical Review Applied, American Physical Society, 2018, 10, pp. 0140116-1-014016-12.

Bulbous corpuxcle, Wikipedia, https://en.wikipedia.org/w/index.php?title=Bulbous_corpuscle&oldid=838390931, Sep. 17, 2018.

S. Chen, et al, "A Review of Tunable Acoustic Metamaterials," Applied Sciences, 2018, 8, 1480, pp. 1-21.

R.T. Verrillo et al., Tactile Responses to Vibration, Institute for Sensory Research, Syracuse University, NY, pp. 1185-1213.

K.J.B. Lee et al., "Highly tunable acoustic metamaterials based on a resonant tubular array," Physical Review B, 2012, 86(18), American Physical Society, pp. 184302-1-184302-5.

F. Casadei et al., "Piezoelectric resonator arrays for tunable acoustic waveguides and metamaterials," Journal of Applied Physics, 112, 2012, American Institute of Physics, pp. 064902-1-064902-5.

A. Rafsanjani et al., "Snapping Mechanical Metamaterials under Tension," Advanced Materials, 2015, pp. 1-10.

A. Baz, "The structure of an active acoustic metamaterial with tunable effective density," New Journal of Physics, IOP Publishing Ltd and Deutsche Physikalische Gesellschaft, 11 (2009) 123010, pp. 1-16.

Z. Liang et al., "Tunable acoustic double negativity metamaterial," Scientific Reports, 2: 859, 2012, pp. 1-5.

L. Hao et al., "Tunable acoustic metamaterial with negative modulus," Applied Physics A, Materials Science & Processing, 2012, 106:807-811.

B. Popa et al., "Tunable active acoustic metamerials," Physical Review B, American Physical Society, 88, 2013, pp. 024303-1-024303-8.

P. Celli, "Tunable directivity in metamaterials with reconfigurable cell symmetry," Appl Phys. Lett. 106, 2015, pp. 091905-1-091905-4.

S. Zhang, "Acoustic Metamaterial Design and Applications," University of Illinois at Urbana-Champaign, 2010, pp. 1-183.

M.S. Rill et al., "Photonic metamaterials by direct laser writing and silver chemical vapour deposition," Nature Materials,, vol. 7, Jul. 2008, Macmillan Publishers Limited, pp. 543-546.

Non-Final Rejection, U.S. Appl. No. 16/525,395, dated Apr. 6, 2020, pp. 1-39.

Norasikin et al., "SounderBender: Dynamic Acoustic Control Behind Obstacles," Session 5: Sensing and Acoustics, UIST 2018, Oct. 14-17, Berlin Germany, pp. 247-259.

Funkhouser et al., "Survey of Methods for Modeling Sound Propagation in Interactive Virtual Environment Systems," Princeton University, Department of Computer Science, pp. 1-53, 2003.

Arafsha et al, "Contactless Haptic Feedback: State of the Art," 2015 IEEE International Symposium on Haptic, Audio and Visual Environments and Games (HAVE), Oct. 11, 2015.

\* cited by examiner

FIG. 3

PERFORM COHERENT ACOUSTIC BEAMFORMING BY CONTROLLING A COHERENT ACOUSTIC BEAMFORMING DEVICE BASED ON AN ACOUSTIC RADIATION PATTERN, IDENTIFIED FROM AN ENVIRONMENTAL ACOUSTIC PROPAGATION CHANNEL MODEL, TO GENERATE ONE OR MORE ACOUSTIC WAVES FOR REFLECTION TOWARDS A TARGET

MULTIPATH ACOUSTIC HOLOGRAPHY AND VIRTUAL HAPTICS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

Technical Field

The present disclosure generally relates to transmitting acoustic waves in a region aided by reflection from environmental objects, and more particularly, to systems and methods for transmitting acoustic waves, e.g. forming acoustic holograms, in a region aided by reflection from environmental objects to provide virtual haptic feedback.

BACKGROUND

Haptic technologies have been developed for recreating senses, e.g. the sense of touch, at users. Specifically, devices have been developed that physically contact users to provide haptic feedback to the users. One of the earliest examples of such devices is a vest that contacts a user and creates vibrations in response to sound waves to apply forces to the user as part of providing haptic feedback. More recently, technologies have been developed that provide haptic feedback without actually having a physical device for reproducing the haptic feedback in contact with, or otherwise in close proximity to a user, e.g. through virtual haptics. For example, acoustic waves have been used to provide haptic feedback virtually to a user without the user wearing a device that reproduces forces at the user. Current systems and techniques for providing virtual haptic feedback suffer from deficiencies in actually and accurately producing haptic feedback for users. For example, current virtual haptic systems typically have to be in a line of sight of a target in order to deliver haptic feedback virtually to the target. There therefore exists needs for systems and techniques for providing virtual haptic feedback that overcome the deficiencies of current virtual haptic systems and techniques.

SUMMARY

According to various embodiments, a method for forming acoustic holograms in a region aided by reflection from environmental objects can include detecting an arrangement of acoustically reflective surfaces in an environment of a target. An environmental acoustic propagation channel model can be generated based on the arrangement of the acoustically reflective surfaces in the environment. Further, an acoustic radiation pattern for reflecting one or more acoustics waves towards the target off of one or more acoustically reflective surfaces of the arrangement of acoustically reflective surface in the environment can be identified. Specifically, the acoustic radiation pattern can be identified using the environmental acoustic propagation channel model. A coherent acoustic beamforming device can be controlled to perform coherent beamforming of an acoustic hologram based on the acoustic radiation pattern. Specifically, the coherent acoustic beamforming device can be controlled to form the acoustic hologram based on the acoustic radiation pattern to generate the one or more acoustic waves for reflection towards the target off of the one or more acoustically reflective surfaces.

In various embodiments, an apparatus for transmitting acoustic waves in a region aided by reflection from environmental objects can include a transmission control module. The transmission control module can be configured to detect an arrangement of acoustically reflective surfaces in an environment of a target to generate an environmental acoustic propagation channel model. Further, the transmission control module can be configured to identify an acoustic radiation pattern for reflecting one or more acoustics waves off of one or more acoustically reflective surfaces of the arrangement of acoustically reflective surface in the environment towards the target. Specifically, the transmission control module can be configured to identify the acoustic radiation pattern for reflecting the one or more acoustic waves towards the target using the identified environmental acoustic propagation channel model. The apparatus can also include one or more transducers of a coherent acoustic beamforming device. The coherent acoustic beamforming device can be configured to perform coherent beamforming based on the acoustic radiation pattern to generate the one or more acoustic waves for reflection towards the target off of the one or more acoustically reflective surfaces.

In certain embodiments, a method for transmitting acoustic waves in a region aided by reflection from environmental objects can include identifying an acoustic radiation pattern for reflecting one or more acoustic waves towards a target off of one or more acoustically reflective surfaces of an arrangement of acoustically reflective surface in an environment. Specifically, the acoustic radiation pattern can be identified using an environmental acoustic propagation channel model of the arrangement of acoustically reflective surface in the environment. Further, a coherent acoustic beamforming device can be controlled to perform coherent beamforming based on the acoustic radiation pattern to generate the one or more acoustic waves for reflection towards the target off the one or more acoustically reflective surfaces.

In various embodiments, a method for transmitting acoustic waves in a region aided by reflection from environmental objects can include performing coherent acoustic beamforming by controlling a coherent acoustic beamforming device to generate one or more acoustic waves for reflection towards a target off of one or more acoustically reflective surfaces in an environment of the target. Specifically, the coherent acoustic beamforming device can be controlled based on an acoustic radiation pattern to generate the one or more acoustic waves for reflection towards the target. The acoustic radiation pattern can be identified from an envi-

BRIEF DESCRIPTION OF THE DRAWINGS

FIG. 3 is a flowchart of an example method of generating acoustic waves for reflection towards a target.

DETAILED DESCRIPTION

Figure 1:
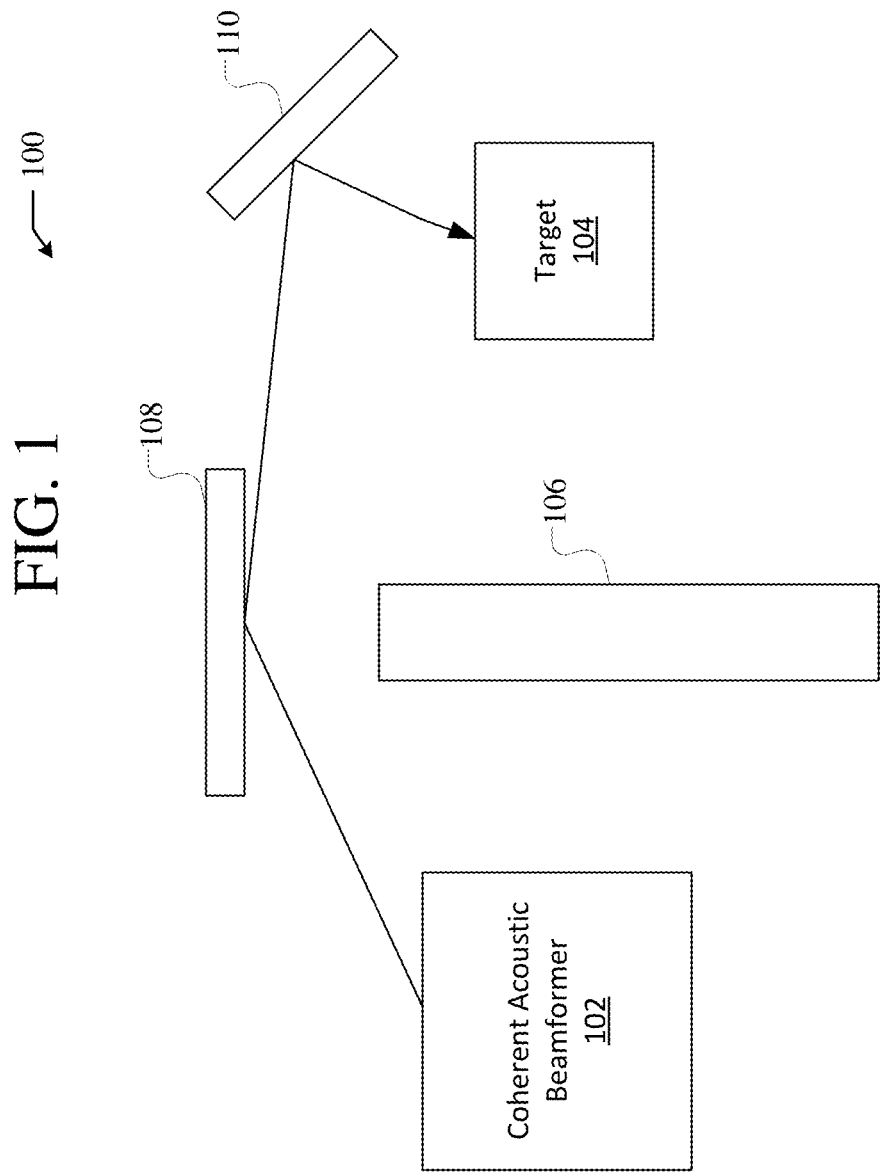
FIG. 1 illustrates an example environment for transmitting acoustic waves to a target through reflection off of acoustically reflective objects in the environment.

The subject disclosure describes improved systems and methods for providing virtual haptic or tactile feedback to a target. Specifically, the subject disclosure describes improved systems and methods for providing virtual haptic or tactile feedback to a target using reflection of acoustic waves off of one or more acoustically reflective surfaces in an environment of the target. While certain applications are discussed in greater detail herein, such discussion is for purposes of explanation, not limitation.

In various embodiments, the subject matter described herein can be implemented using metamaterials/metamaterial-based structures. Metamaterials generally feature subwavelength elements, i.e. structural elements with portions having electromagnetic length scales smaller than an operating wavelength of the metamaterial, and the subwavelength elements have a collective response to electromagnetic radiation that corresponds to an effective continuous medium response, characterized by an effective permittivity, an effective permeability, an effective magnetoelectric coefficient, or any combination thereof. For example, the electromagnetic radiation may induce charges and/or currents in the subwavelength elements, whereby the subwavelength elements acquire nonzero electric and/or magnetic dipole moments. Where the electric component of the electromagnetic radiation induces electric dipole moments, the metamaterial has an effective permittivity; where the magnetic component of the electromagnetic radiation induces magnetic dipole moments, the metamaterial has an effective permeability; and where the electric (magnetic) component induces magnetic (electric) dipole moments (as in a chiral metamaterial), the metamaterial has an effective magnetoelectric coefficient. Some metamaterials provide an artificial magnetic response; for example, split-ring resonators (SRRs)—or other LC or plasmonic resonators—built from nonmagnetic conductors can exhibit an effective magnetic permeability (c.f. J. B. Pendry et al, "Magnetism from conductors and enhanced nonlinear phenomena," IEEE Trans. Micro. Theo. Tech. 47, 2075 (1999), herein incorporated by reference). Some metamaterials have "hybrid" electromagnetic properties that emerge partially from structural characteristics of the metamaterial, and partially from intrinsic properties of the constituent materials. For example, G. Dewar, "A thin wire array and magnetic host structure with n<0," J. Appl. Phys. 97, 10Q101 (2005), herein incorporated by reference, describes a metamaterial consisting of a wire array (exhibiting a negative permeability as a consequence of its structure) embedded in a nonconducting ferrimagnetic host medium (exhibiting an intrinsic negative permeability). Metamaterials can be designed and fabricated to exhibit selected permittivities, permeabilities, and/or magnetoelectric coefficients that depend upon material properties of the constituent materials as well as shapes, chiralities, configurations, positions, orientations, and couplings between the subwavelength elements. The selected permittivites, permeabilities, and/or magnetoelectric coefficients can be positive or negative, complex (having loss or gain), anisotropic, variable in space (as in a gradient index lens), variable in time (e.g. in response to an external or feedback signal), variable in frequency (e.g. in the vicinity of a resonant frequency of the metamaterial), or any combination thereof. The selected electromagnetic properties can be provided at wavelengths that range from radio wavelengths to infrared/visible wavelengths; the latter wavelengths are attainable, e.g., with nanostructured materials such as nanorod pairs or nano-fishnet structures (c.f. S. Linden et al, "Photonic metamaterials: Magnetism at optical frequencies," IEEE J. Select. Top. Quant. Elect. 12, 1097 (2006) and V. Shalaev, "Optical negative-index metamaterials," Nature Photonics 1, 41 (2007), both herein incorporated by reference). An example of a three-dimensional metamaterial at optical frequencies, an elongated-split-ring "woodpile" structure, is described in M. S. Rill et al, "Photonic metamaterials by direct laser writing and silver chemical vapour deposition," Nature Materials advance online publication, May 11, 2008, (doi:10.1038/nmat2197).

While many exemplary metamaterials are described as including discrete elements, some implementations of metamaterials may include non-discrete elements or structures. For example, a metamaterial may include elements comprised of sub-elements, where the sub-elements are discrete structures (such as split-ring resonators, etc.), or the metamaterial may include elements that are inclusions, exclusions, layers, or other variations along some continuous structure (e.g. etchings on a substrate). Some examples of layered metamaterials include: a structure consisting of alternating doped/intrinsic semiconductor layers (cf. A. J. Hoffman, "Negative refraction in semiconductor metamaterials," Nature Materials 6, 946 (2007), herein incorporated by reference), and a structure consisting of alternating metal/dielectric layers (cf. A. Salandrino and N. Engheta, "Far-field subdiffraction optical microscopy using metamaterial crystals: Theory and simulations," Phys. Rev. B 74, 075103 (2006); and Z. Jacob et al, "Optical hyperlens: Far-field imaging beyond the diffraction limit," Opt. Exp. 14, 8247 (2006); each of which is herein incorporated by reference). The metamaterial may include extended structures having distributed electromagnetic responses (such as distributed inductive responses, distributed capacitive responses, and distributed inductive-capacitive responses). Examples include structures consisting of loaded and/or interconnected transmission lines (such as microstrips and striplines), artificial ground plane structures (such as artificial perfect magnetic conductor (PMC) surfaces and electromagnetic band gap (EGB) surfaces), and interconnected/extended nanostructures (nano-fishnets, elongated SRR woodpiles, etc.).

According to various embodiments, a method for forming acoustic holograms in a region aided by reflection from environmental objects can include detecting an arrangement of acoustically reflective surfaces in an environment of a target. An environmental acoustic propagation channel model can be generated based on the arrangement of the acoustically reflective surfaces in the environment. Further, an acoustic radiation pattern for reflecting one or more acoustics waves towards the target off of one or more acoustically reflective surfaces of the arrangement of acoustically reflective surface in the environment can be identified. Specifically, the acoustic radiation pattern can be identified using the environmental acoustic propagation channel model. A coherent acoustic beamforming device can be controlled to perform coherent beamforming of an acoustic hologram based on the acoustic radiation pattern. Specifically, the coherent acoustic beamforming device can be controlled to form the acoustic hologram based on the acoustic radiation pattern to generate the one or more acoustic waves for reflection towards the target off of the one or more acoustically reflective surfaces.

In various embodiments, an apparatus for transmitting acoustic waves in a region aided by reflection from environmental objects can include a transmission control module. The transmission control module can be configured to detect an arrangement of acoustically reflective surfaces in an environment of a target to generate an environmental acoustic propagation channel model. Further, the transmission control module can be configured to identify an acoustic radiation pattern for reflecting one or more acoustics waves off of one or more acoustically reflective surfaces of the arrangement of acoustically reflective surface in the environment towards the target. Specifically, the transmission control module can be configured to identify the acoustic radiation pattern for reflecting the one or more acoustic waves towards the target using the identified environmental acoustic propagation channel model. The apparatus can also include one or more transducers of a coherent acoustic beamforming device. The coherent acoustic beamforming device can be configured to perform coherent beamforming based on the acoustic radiation pattern to generate the one or more acoustic waves for reflection towards the target off of the one or more acoustically reflective surfaces.

In certain embodiments, a method for transmitting acoustic waves in a region aided by reflection from environmental objects can include identifying an acoustic radiation pattern for reflecting one or more acoustic waves towards a target off of one or more acoustically reflective surfaces of an arrangement of acoustically reflective surface in an environment. Specifically, the acoustic radiation pattern can be identified using an environmental acoustic propagation channel model of the arrangement of acoustically reflective surface in the environment. Further, a coherent acoustic beamforming device can be controlled to perform coherent beamforming based on the acoustic radiation pattern to generate the one or more acoustic waves for reflection towards the target off the one or more acoustically reflective surfaces.

In various embodiments, a method for transmitting acoustic waves in a region aided by reflection from environmental objects can include performing coherent acoustic beamforming by controlling a coherent acoustic beamforming device to generate one or more acoustic waves for reflection towards a target off of one or more acoustically reflective surfaces in an environment of the target. Specifically, the coherent acoustic beamforming device can be controlled based on an acoustic radiation pattern to generate the one or more acoustic waves for reflection towards the target. The acoustic radiation pattern can be identified from an environmental acoustic propagation channel model of an arrangement of acoustically reflective surfaces in the environment of the target.

Some of the infrastructure that can be used with embodiments disclosed herein is already available, such as general-purpose computers, RF antennas, computer programming tools and techniques, digital storage media, and communications networks. A computing device may include a processor such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once.

FIG. 1 illustrates an example environment 100 for transmitting acoustic waves to a target through reflection off of acoustically reflective objects in the environment. The example environment 100 shown in FIG. 1 includes a coherent acoustic beamformer 102 and a target 104. The coherent acoustic beamformer 102 is configured to perform coherent beamforming to generate acoustic waves for transmission towards the target 104. In particular, the coherent acoustic beamformer 102 can generate acoustic waves for creating an acoustic hologram at or near the target 104. In turn, the target 104 can be a user that is capable of interacting with or otherwise receiving the acoustic waves, e.g. an acoustic hologram, transmitted towards the target 104 by the coherent acoustic beamformer 102. Transmission towards a target, as used herein, can include transmission towards the target through reflection off on or more acoustically reflective surfaces.

Acoustic waves transmitted by the coherent acoustic beamformer 102 toward the target 104 can include narrowband acoustic waves. Narrowband acoustic waves, as used herein, can include acoustic waves within a frequency band having a bandwidth less than 10 kHz. For example, narrowband acoustic waves can be within a frequency band having a bandwidth of less than 10 kHz while still being capable of transmitting an audible speech signal or broadband acoustic communications. In another example, narrowband acoustic waves can be within a frequency band having a bandwidth of less than 1 kHz. Additionally, acoustic waves transmitted by the coherent acoustic beamformer 102 towards the target 104 can include ultrasonic waves. For example, acoustic waves transmitted by the coherent acoustic beamformer 102 towards the target 104 can include ultrasonic waves with frequencies greater than 30 kHz.

Further, acoustic waves transmitted by the coherent acoustic beamformer 102 towards the target 104 can be modulated. Specifically, the acoustic waves transmitted by the coherent acoustic beamformer 102 can be amplitude modulated. More specifically, the acoustic waves can be amplitude modulated by the coherent acoustic beamformer 102 at one or more frequencies in an applicable frequency range, e.g. a frequency range of 1 to 500 Hz.

Acoustic waves generated by the coherent acoustic beamformer 102, and ultimately transmitted towards the target 104, can be used to provide virtual haptic feedback or tactile feedback to the target 104. Specifically, acoustic waves transmitted towards the target 104 by the coherent acoustic beamformer 102 can provide haptic feedback by creating a region of haptic sensation in mid-air at the target 104, e.g. as an acoustic hologram at the target 104. In turn, the target 104 can interact with the region of haptic sensation in mid-air to receive the haptic feedback from the coherent acoustic beamformer 102. By interacting with a region of haptic sensation in mid-air created by acoustic waves transmitted from the coherent acoustic beamformer 102, the target 104 can receive haptic feedback absent a haptic reproduction device present at the target 104, e.g. receive virtual haptic feedback. For example, the target 104 can be a hand of a user that receives haptic feedback without wearing a physical device by simply interacting with the region of haptic sensation created in mid-air by the coherent acoustic beamformer 102.

Further, acoustic waves generated by the coherent acoustic beamformer 102, and ultimately transmitted towards the target 104, can be used to image the target 104. For example, the target 104 can reflect and/or scatter the acoustic waves transmitted towards the target 104 by the coherent acoustic beamformer 102. In turn, properties of the acoustic waves reflected and/or scattered by the target can then be sensed by a sensor, e.g. a sensor implemented in operation with the coherent acoustic beamformer 102, to generate one or more images of the target 104.

Additionally, the acoustic waves generated by the coherent acoustic beamformer 102, and ultimately transmitted towards the target 104, can be configured to provide gesture recognition at the target 104. Specifically, the target 104 can reflect and/or scatter the acoustic waves transmitted towards the target 104 by the coherent acoustic beamformer 102. In turn, properties of the acoustic waves reflected and/or scattered by the target can then be sensed by a sensor, e.g. a sensor implemented in operation with the coherent acoustic beamformer 102, to recognize gestures made by the target 104.

The coherent acoustic beamformer 102 can comprise a fully dense array of transducers for generating and ultimately transmitting the acoustic waves towards the target 104. For example, the coherent acoustic beamformer 102 can comprise an array of transducers that each are each physically spaced to achieve a Nyquist sampling spacing with respect to each other. More specifically, transducers in the coherent acoustic beamformer 102 can comprise a fully dense array of transducers that are positioned or defined at a Nyquist spatial resolution (half-wavelength) with respect to frequencies of acoustic waves generated by the coherent acoustic beamformer 102 and transmitted towards the target 104.

Alternatively, the coherent acoustic beamformer 102 can comprise an overly dense array of transducers. Specifically, the coherent acoustic beamformer 102 can comprise an array of transducers that each are physically spaced to achieve less than a Nyquist sample spacing with respect to each other. More specifically, transducers in the coherent acoustic beamformer 102 can comprise an overly dense array of transducers that are positioned or defined less than a Nyquist spatial resolution with respect to frequencies of acoustic waves generated by the coherent acoustic beamformer 102 and transmitted towards the target 104.

Further, the coherent acoustic beamformer 102 can comprise a sparse array of transducers. Specifically, the coherent acoustic beamformer 102 can comprise an array of transducers that each are physically spaced to greater than a Nyquist sample spacing with respect to each other. More specifically, transducers in the coherent acoustic beamformer 102 can comprise a sparse array of transducers that are positioned or defined greater than a Nyquist spatial resolution with respect to frequencies of acoustic waves generated by the coherent acoustic beamformer 102 and transmitted towards the target 104.

When implemented as a sparse array of transducers, the coherent acoustic beamformer 102 can include a fully dense array of passive acoustically-scattering elements that complements the sparse array of transducers. Specifically, the coherent acoustic beamformer 102 can include a fully dense array of photonic crystal elements. Further, when implemented as a sparse array of transducers, the coherent acoustic beamformer 102 can include an overly dense array of passive acoustically-scattering elements that complement the sparse array of transducers. Specifically, the coherent acoustic beamformer 102 can include an overly dense array formed by an acoustic metamaterial and/or an acoustic metasurface. A metasurface, as used herein, can include a single layer of a metamaterial.

The coherent acoustic beamformer 102 can be formed, at least in part, by one or more artificially-structured materials. Generally speaking, the electromagnetic properties of artificially-structured materials derive from their structural configurations, rather than or in addition to their material composition. Artificially-structured materials included as part of the coherent acoustic beamformer 102 can include one or more subwavelength elements. Specifically, artificially-structured materials included as part of the coherent acoustic beamformer 102 can have one or more characteristics that are less than a wavelength of one or more feed waves used by the coherent acoustic beamformer 102 to generate the acoustic waves. For example, artificially-structured materials included as part of the coherent acoustic beamformer 102 can have transmission channels that are less than a wavelength or corresponding feed waves.

Further, artificially-structured materials included as part of the coherent acoustic beamformer 102 can include one or more metamaterials or metasurfaces. Metamaterials and metasurfaces included as part of the artificially-structured materials forming the coherent acoustic beamformer 102 can include one or more dynamic or tunable acoustic metamaterials. Dynamic metamaterials, as used herein, are metamaterials having properties that are tunable without actually generating acoustic waves as a result of tuning/changing properties of the metamaterials. For example, a dynamic metamaterial can include a material that is tunable to change acoustic waves from a feed source without generating additional acoustic waves. Further, metamaterials and metasurfaces included as prat of the artificially-structured materials forming the coherent acoustic beamformer 102 can include one or more active acoustic metamaterials. Active metamaterials, as used herein, are metamaterials that are configured to generate acoustic waves themselves, e.g. in response to feed waves.

Artificially-structured materials included as part of the coherent acoustic beamformer 102 can form a multi-holographic artificially-structured layer configured to generate the acoustic waves. The multi-holographic artificially-structured layer can include a plurality of specific wave holograms corresponding to different and specific output acoustic beam patterns. For example, the multi-holographic artificially-structured layer can be reconfigurable to achieve/retrieve a specific wave hologram to create a specific acoustic beam pattern, e.g. acoustic hologram, corresponding to the specific wave hologram. The wave holograms can be pre-defined and physically embedded in the multi-holographic artificially-structured layer. For example, the multi-holographic artificially-structured layer can be manufactured to include the different wave holograms corresponding to the different and specific output acoustic beam patterns.

A multi-holographic artificially-structured layer forming, at least in part, the coherent acoustic beamformer 102 can include transducers in a fully dense array of transducers. Specifically, the multi-holographic artificially-structured layer can be formed by an array of transducers that are each spaced by less than or equal to one half Nyquist sampling spacing. Further, a multi-holographic artificially-structured layer forming, at least in part, the coherent acoustic beamformer 102 can be configured to generate the acoustic waves from one or more intermediate acoustic waves provided by a sparse array of transducers, e.g. of a feed source. The sparse array of transducers providing the one or more intermediate acoustic waves to the multi-holographic artificially-structured layer can include transducers that are spaced by greater than one half Nyquist sampling spacing.

The coherent acoustic beamformer 102 can transmit the acoustic waves towards the target 104 using one or more acoustically reflective surfaces, e.g. acoustically reflective surfaces of objects, in the environment 100. In particular, the coherent acoustic beamformer 102 can use acoustic reflection to transmit the acoustic waves to the target 104 off of one or more acoustically reflective surfaces in the environment 100. For example, the environment 100 includes a first object 106, a second object 108, and a third object 110. Both the second object 108 and the third object 110 are objects with one or more acoustically reflective surfaces. An acoustically reflective surface, as used herein, can include a surface that is capable of reflecting incident acoustic waves. For example, an acoustically reflective surface can include a natural wall, a natural ceiling, a building wall, a room ceiling, a window, a windshield of a vehicle, a surface in a vehicle cabin, a piece of furniture, a surface of an indoor appliance, a piece of clothing, and a surface of a human body. Specifically, an acoustically reflective surface can have an acoustical reflection coefficient greater than or equal to 0.9 for at least one angle of incidence and one operational frequency of one or more incident acoustic waves, e.g. the acoustic waves generated and transmitted by the coherent acoustic beamformer 102.

In the example environment 100 shown in FIG. 1, the coherent acoustic beamformer 102 transmits the generated acoustic waves towards the second object 108. The second object 108 then reflects the acoustic waves towards the third object 110. The third object 110 then reflects the acoustic waves towards the target 104, where the acoustic waves can be used to provide haptic feedback to the target 104. While, the arrangement shown in the example environment 100 includes two objects and two reflective hops for ultimately transmitting the acoustic waves towards the target 104, in various embodiments, more or fewer object and more or fewer reflective hops can be used to transmit the acoustic waves from the coherent acoustic beamformer 102 to the target 104. For example, the coherent acoustic beamformer 102 can transmit the acoustic waves to the target 104 through one reflective hop off of a single reflective object/surface in the environment 100.

In the example environment 100 shown in FIG. 1, the first object 106 is positioned between the coherent acoustic beamformer 102 and the target 104. The first object 106 can be of a size and a shape to block a line of sight between the coherent acoustic beamformer 102 and the target 104. Specifically, the first object 106 can be of a size and a shape to prevent the coherent acoustic beamformer 102 from directly transmitting acoustic waves towards the target 104, e.g. along the line of sight between coherent acoustic beamformer 102 and the target 104. As a result, the coherent acoustic beamformer 102 can use acoustic reflection, e.g. off of the second object 108 and the third object 110, to transmit acoustic waves around the first object 106 to the target 104.

Using acoustic reflection to transmit acoustic waves for providing haptic feedback can be useful when a specific area of the body is a target for receiving the haptic feedback. For example, the palm of the hand is very sensitive and receptive to haptic feedback. Often times, however, the palm of the hand is obscured or otherwise not in a line of sight of a system for providing virtual haptic feedback, e.g. the coherent acoustic beamformer 102. However acoustic reflection can be used to deliver virtual haptic feedback to the palm when the palm is not in a line of sight of a source of the acoustic waves, e.g. the coherent acoustic beamformer 102.

Figure 2:
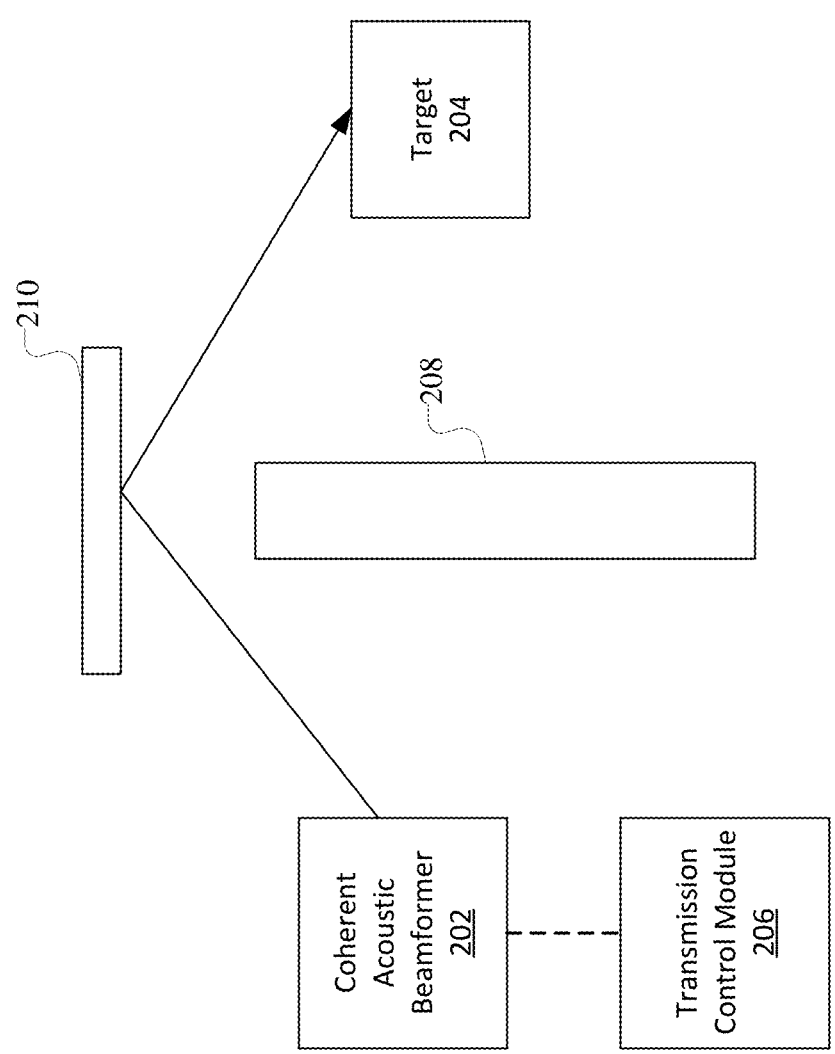
FIG. 2 shows an example environment for transmitting acoustic waves towards a target based on a detected arrangement of acoustically reflective surfaces in the environment.

Acoustic waves can be transmitted towards a target to deliver haptic feedback to the target based on an arrangement, e.g. a detected arrangement, of acoustically reflective surfaces in the environment. Specifically, FIG. 2 shows an example environment 200 for transmitting acoustic waves towards a target based on a detected arrangement of acoustically reflective surfaces in the environment 200. The example environment 200 includes a coherent acoustic beamformer 202, a target 204, and a transmission control module 206. Additionally, the environment 200 includes a first object 208 and an acoustically reflective surface 210. In the environment 200, the first object 208 is in a line of sight between the coherent acoustic beamformer 202 and the target 204.

The coherent acoustic beamformer 202 functions according to an applicable beamformer for generating acoustic waves to provide haptic feedback to the target 204, such as the coherent acoustic beamformers described herein. For example, the coherent acoustic beamformer 202 can generate and transmit acoustic waves for forming an acoustic hologram at the target 204. As the first object 208 blocks the line of sight between the coherent acoustic beamformer 202 and the target 204, the coherent acoustic beamformer 202 can transmit the acoustic waves towards the acoustically reflective surface 210. As follows, the acoustically reflective surface 210 can reflect incident acoustic waves transmitted by the coherent acoustic beamformer 202 towards the target 204.

The transmission control module 206 functions to control the coherent acoustic beamformer 202 for transmitting acoustic waves towards the target 204 through reflection based on an arrangement of acoustically reflective surfaces in the environment 200. An arrangement of acoustically reflective surfaces in the environment 200 can include positions of the acoustically reflective surfaces in the environment 200 and orientations of the acoustically reflective surfaces in the environment 200, e.g. with respect to the coherent acoustic beamformer 202. For example, an arrangement of acoustically reflective surfaces can include that an acoustically reflective surface is positioned five feet away from the coherent acoustic beamformer 202 at an angle of 40° with respect to the coherent acoustic beamformer 202.

The transmission control module 206 can be implemented as part of the coherent acoustic beamformer 202. For example, the transmission control module 206 and the coherent acoustic beamformer 202 can be implemented in the same device. Alternatively, the transmission control module 206 can be implemented as a separate device external to the coherent acoustic beamformer 202. Specifically, the transmission control module 206 can be implemented as a separate device that is communicatively coupled, e.g. wired or wirelessly, to the coherent acoustic beamformer 202.

In controlling the coherent acoustic beamformer 202, the transmission control module 206 can identify an acoustic radiation pattern for reflecting acoustic waves from the coherent acoustic beamformer 202 towards the target 204. An acoustic radiation pattern can include a radiation pattern that the coherent acoustic beamformer 202 should create in radiating acoustic waves for transmission towards the target 204 through reflection of off one or more acoustically reflective surface. For example, if the coherent acoustic beamformer 202 should transmit acoustic waves at an angle of 45° in order to transmit the acoustic waves to the target 204 through reflection, then the acoustic radiation pattern can include transmitting acoustic waves at an angle of 45°. As follows, the transmission control module 206 can control the coherent acoustic beamformer 202 to transmit acoustic waves, according to an identified acoustic radiation pattern, to reflect the acoustic waves towards the target 204. For example, the transmission control module 206 can control the coherent acoustic beamformer 202 to perform coherent beamforming of an acoustic hologram based on an acoustic radiation pattern to generate one or more acoustic waves for reflection towards the target 204 off of one or more acoustically reflective surfaces.

The transmission control module 206 can identify an environmental acoustic propagation channel model for the environment 200. An environmental acoustic propagation channel model can be a model describing how an acoustic wave will propagate through an environment based on transmission characteristics of the acoustic wave and a source of the acoustic wave. More specifically, an environmental acoustic propagation channel model can be a model describing how an acoustic wave will propagate through an environment based on interaction of the acoustic wave with objects/surfaces in the environment, e.g. through reflection, scattering, diffraction, and absorption. For example, an environmental acoustic propagation channel model can describe where an acoustic wave will propagate in an environment based on acoustic reflection in the environment. In another example, an environmental acoustic propagation channel model can include diffractive effects of acoustic wave propagation in an environment, e.g. scattering off edges and other subwavelength features in the environment. The transmission control module 206 can use an identified environmental acoustic propagation channel model to identify an acoustic radiation pattern for reflecting acoustic waves transmitted by the coherent acoustic beamformer 202 towards the target 204. As follows, the transmission control module 206 can control the coherent acoustic beamformer 202 to generate one or more acoustic waves according to the acoustic radiation pattern identified using the environmental acoustic propagation channel model.

The transmission control module 206 can identify an environmental acoustic propagation channel model for the environment 200 based on applicable information of acoustically reflective surfaces in the environment 200. Specifically, the transmission control module 206 can identify an environmental acoustic propagation channel model based on orientations of acoustically reflective surfaces in the environment 200. For example, if an acoustically reflective surface is orientated 50° with respect to the coherent acoustic beamformer 202, then the transmission control module 206 can identify an environmental acoustic propagation channel model based on the orientation of the surface with respect to the coherent acoustic beamformer 202. Additionally, the transmission control module 206 can identify an environmental acoustic propagation channel model based on positions of acoustically reflective surfaces in the environment 200. For example if an acoustically reflective surface is positioned 10 meters away from the coherent acoustic beamformer 202, then the transmission control module 206 can identify an environmental acoustic propagation channel model based on the position of the surface with respect to the coherent acoustic beamformer 202.

Further, the transmission control module 206 can identify an environmental acoustic propagation channel model based on coherent acoustic beamforming properties of acoustically reflective surfaces in the environment 200. For example, the transmission control module 206 can identify an environmental acoustic propagation channel model based on acoustical reflection coefficients of surfaces in the environment 200. In another example, the transmission control module 206 can identify an environmental acoustic propagation channel model based on diffractive effects of surfaces in the environment 200, e.g. acoustic scattering off of edges and subwavelength features of the surfaces in the environment 200.

The transmission control module 206 can identify an acoustic propagation channel model based on static acoustically reflective surfaces in the environment 200. In particular, the transmission control module 206 can identify an acoustics propagation channel model for the environment 200 based on previously known static positions of acoustically reflective surfaces in the environment 200. For example, if an object is static in the environment 200 at a position of 10 meters away from the coherent acoustic beamformer 202, then the transmission control module 206 can identify an acoustic propagation channel model based on the object being statically positioned 10 meters away from the coherent acoustic beamformer 202. In another example, if a surface is static in the environment 200 at an orientation of 50° with respect to the coherent acoustic beamformer 202, then the transmission control module 206 can identify an acoustic propagation channel model based on the surface being statically orientated 50° with respect to the coherent acoustic beamformer 202.

Additionally, the transmission control module 206 can identify an acoustic propagation model based on actively determined positions and/or orientations of acoustically reflectively surfaces in the environment 200. In actively determining positions and/or orientations of acoustically reflective surfaces in the environment 200, the transmission control module 206 can determine positions and orientations of the surfaces as the positions and orientations of the surfaces change or do not change in the environment 200 over time. For example, the transmission control module 206 can actively determine that a position of a surface with respect to the coherent acoustic beamformer 202 has changed as the surface moves in the environment 200.

Subsequently, the transmission control module 206 can generate and/or update an acoustic propagation model for the environment 200 based on the changed position of the surface within the environment 200.

The transmission control module 206 can be implemented as part of the coherent acoustic beamformer 202 and configured to actively track positions and orientations of acoustically reflective surfaces in the environment 200. Specifically, the transmission control module 206 can be configured to actively track positions and orientations of the acoustically reflective surfaces in the environment 200 from the location of the coherent acoustic beamformer 202 in the environment 200. Alternatively, the transmission control module 206 can be implemented as a separate external device from the coherent acoustic beamformer 202 and configured to actively track positions and orientations of acoustically reflective surfaces in the environment 200. Specifically, the transmission control module 206 can be configured to actively track positions and orientations of the acoustically reflective surfaces in the environment 200 from a position remote from the coherent acoustic beamformer 202 in the environment 200.

The transmission control module 206 can use an acoustic tracking technique for actively tracking positions and orientations of acoustically reflective surfaces in the environment 200. An acoustic tracking technique can include an applicable tracking technique for actively identifying positions and orientations of acoustically reflective surfaces using acoustics. Specifically, an acoustic tracking technique can include an acoustic technique for actively identifying positions and orientations of acoustically reflective surfaces as the positions and orientations of the acoustically reflective surfaces either change or do not change over time. More specifically, the transmission control module 206 can actively track the positions and orientations of the acoustically reflective surfaces based on characteristics of acoustic waves scattered and/or reflected by the acoustically reflective surfaces in the environment 200, e.g. wave acoustics. For example, the transmission control module 206 can use acoustic ranging or another applicable acoustic tracking technique to actively track positions and orientations of the acoustically reflective surfaces in the environment 200.

Further, the transmission control module 206 can use an optical tracking technique for actively tracking positions and orientations of acoustically reflective surfaces in the environment 200. An optical tracking technique can include an applicable tracking technique for actively identifying positions and orientations of acoustically reflective surfaces using optics. Specifically, an optical tracking technique can include an optical technique for actively identifying positions and orientations of acoustically reflective surfaces as the positions and orientations of the acoustically reflective surfaces either change or do not change over time. More specifically, the transmission control module 206 can actively track the positions and orientations of the acoustically reflective surfaces based on characteristics of electromagnetic waves in the optical spectrum that are scattered and/or reflected by the acoustically reflective surfaces in the environment 200. For example, the transmission control module 206 can use optical ranging to actively track positions and orientations of the acoustically reflective surfaces in the environment 200. In another example, the transmission control module 206 can use structured illumination active sensing to actively track positions and orientations of the acoustically reflective surfaces in the environment 200. In yet another example, the transmission control module 206 can use scanning optical beam active sensing to actively track positions and orientations of the acoustically reflective surfaces in the environment 200.

The transmission control module 206 can use mmWave electromagnetic radiation, e.g. electromagnetic radiation in the 30 GHz to 300 GHz band, to actively track positions and orientations of acoustically reflective surfaces in the environment 200. For example, the transmission control module 206 can use applicable mmWave techniques, such as mmWave ranging, mmWave tracking, and/or mmWave imaging, to actively track positions and orientations of the acoustically reflective surfaces in the environment 200.

Further, the transmission control module 206 can use radar to actively track positions and orientations of the acoustically reflective surfaces in the environment 200. In particular, the transmission control module 206 can use multiple-input multiple-output (MIMO) radar to actively track positions and orientations of the acoustically reflective surfaces in the environment 200. Additionally, the transmission control module 206 can use infrared imaging to actively track positions and orientations of the acoustically reflective surfaces in the environment 200.

The transmission control module 206 can also generate an environmental acoustic propagation channel model based on either or both a position and an orientation of the target 204 in the environment 200. Specifically, the transmission control module 206 can generate the environmental acoustic propagation channel model to indicate how acoustic waves will interact with the target 204, thereby affecting the overall propagation characteristics of the acoustic waves in the environment 200. In generating the environmental acoustic propagation channel model based on position and/or orientation of the target 204, the transmission control module 206 can generate the model based on the position and/or the orientation of the target with respect to one or more acoustically reflective surfaces in the environment. For example, if acoustic waves will reflect off of a surface towards the target 204 when the target 204 is at a specific position with respect to the surface, then the transmission control module 206 can generate the model to indicate that acoustic waves will reflect off of the surface towards the target 204 when the target is at the specific position.

In generating an environmental acoustic propagation channel model based on a position and/or orientation of the target 204, the transmission control module 206 can generate the model based on an unchanging position and/or orientation of the target 204 in the environment 200. For example, the target 204 can remain stationary in the environment 200, and the transmission control module 206 can maintain the environmental acoustic propagation channel model based on the unchanging position and orientation of the target 204 in the environment 200. Further, the transmission control module 206 can generate the environmental acoustic propagation channel model based on a previously known position and/or orientation of the target 204 in the environment 200. For example, if a target 204 is known to previously occupy the center of a room, then the transmission control module 206 can generate the environmental acoustic propagation channel model based on the position and orientation of the target 204 in the center of the room, e.g. the established position and orientation of the target 204 in the environment.

Additionally, the transmission control module 206 can identify an acoustic propagation model based on actively determined position and/or orientation of the target 204 in the environment 200. In actively determining position and/or orientation of the target 204 in the environment 200, the transmission control module 206 can determine positions and orientations of the target 204 as the positions and orientations of the target 204 change or do not change in the environment 200 over time. For example, the transmission control module 206 can actively determine that a position of the target 204 with respect to the coherent acoustic beamformer 202 has changed as the target 204 moves in the environment 200. Subsequently, the transmission control module 206 can generate and/or update an acoustic propagation model for the environment 200 based on the changed position of the target 204 within the environment 200.

Further, the transmission control module 206 can be implemented as part of the coherent acoustic beamformer 202 and configured to actively track position and orientation of the target 204 in the environment 200. Specifically, the transmission control module 206 can be configured to actively track position and orientation of the target 204 in the environment 200 from the location of the coherent acoustic beamformer 202 in the environment 200. Alternatively, the transmission control module 206 can be implemented as a separate external device from the coherent acoustic beamformer 202 and configured to actively track position and orientation of the target 204 in the environment 200. Specifically, the transmission control module 206 can be configured to actively track position and orientation of the target 204 from a position remote from the coherent acoustic beamformer 202 in the environment 200.

The transmission control module 206 can be configured to actively track the target 204 using the same techniques and systems described previously with respect to the transmission control module 206 actively tracking acoustically reflective surfaces. Specifically, the transmission control module 206 can use one or a combination of Sonar, optical sensing, light sensing, structured light sensing, scanning beam optics, mmWave imaging, radar, MIMO radar, and infrared imaging to actively track a position and orientation of the target 204 in the environment.

In using positions and orientations of either or both acoustically reflective surfaces and the target 204 in the environment to generate an environmental acoustic propagation channel model, the transmission control module 206 can use ray acoustics to generate the environmental acoustic propagation channel model. Specifically, the transmission control module 206 can use ray acoustics/geometrical acoustics to identify positions and orientations of acoustically reflective surfaces and the target 204 in the environment 200. In particular, the transmission control module 206 can analyze properties of acoustic waves along trajectories within the environment 200 to identify positions and orientations of acoustically reflective surfaces and the target 204 in the environment 200. Ray acoustics can be used by the transmission control module to actively track positions and orientations of either or both the target 204 and acoustically reflective surfaces in the environment 200.

Further, the transmission control module 206 can use acoustic beam propagation modeling to generate an environmental acoustic propagation channel model. Specifically, the transmission control module 206 can broadcast, e.g. scan, an acoustic beam into the environment 200. In turn, based on energy, e.g. acoustic energy, received as a result of the acoustic beam propagating in the environment 200, positions and orientations of acoustically reflective surfaces and the target 204 in the environment can be identified for generating the environmental acoustic propagation channel model.

While reference is made throughout this paper to the transmission control module 206 determining positions and orientations of acoustically reflective surfaces and the target 204, in various embodiments, the transmission control module 206 can use an external device to determine positions and orientations of the acoustically reflective surfaces and the target 204. Specifically, an external/separate device or system can identify positions and orientations of the acoustically reflective surfaces and the target 204. Subsequently, the external device can provide the position and orientation information of the surfaces and the target 204 to the transmission control module 206, as part of the transmission control module 206 identifying the positions and orientations of the surfaces and the target 204.

FIG. 3 is a flowchart 300 of an example method of generating acoustic waves for reflection towards a target. Specifically the flowchart 300 can be implemented to generate acoustic waves for reflection towards a target to provide haptic feedback to the target. At step 302, acoustic beamforming is performed by controlling a coherent acoustic beamforming device to generate one or more acoustic waves for reflection towards a target. Specifically, the transmission control module 206 can control the coherent acoustic beamformer 202 to perform acoustic beamforming for generating one or more acoustic waves based on an acoustic radiation pattern. The acoustic radiation pattern can be identified using the techniques described herein. For example, the acoustic radiation pattern can be identified based on an environmental acoustic propagation channel model of an environment in which the acoustic waves are transmitted to deliver haptic feedback.

Figure 4:
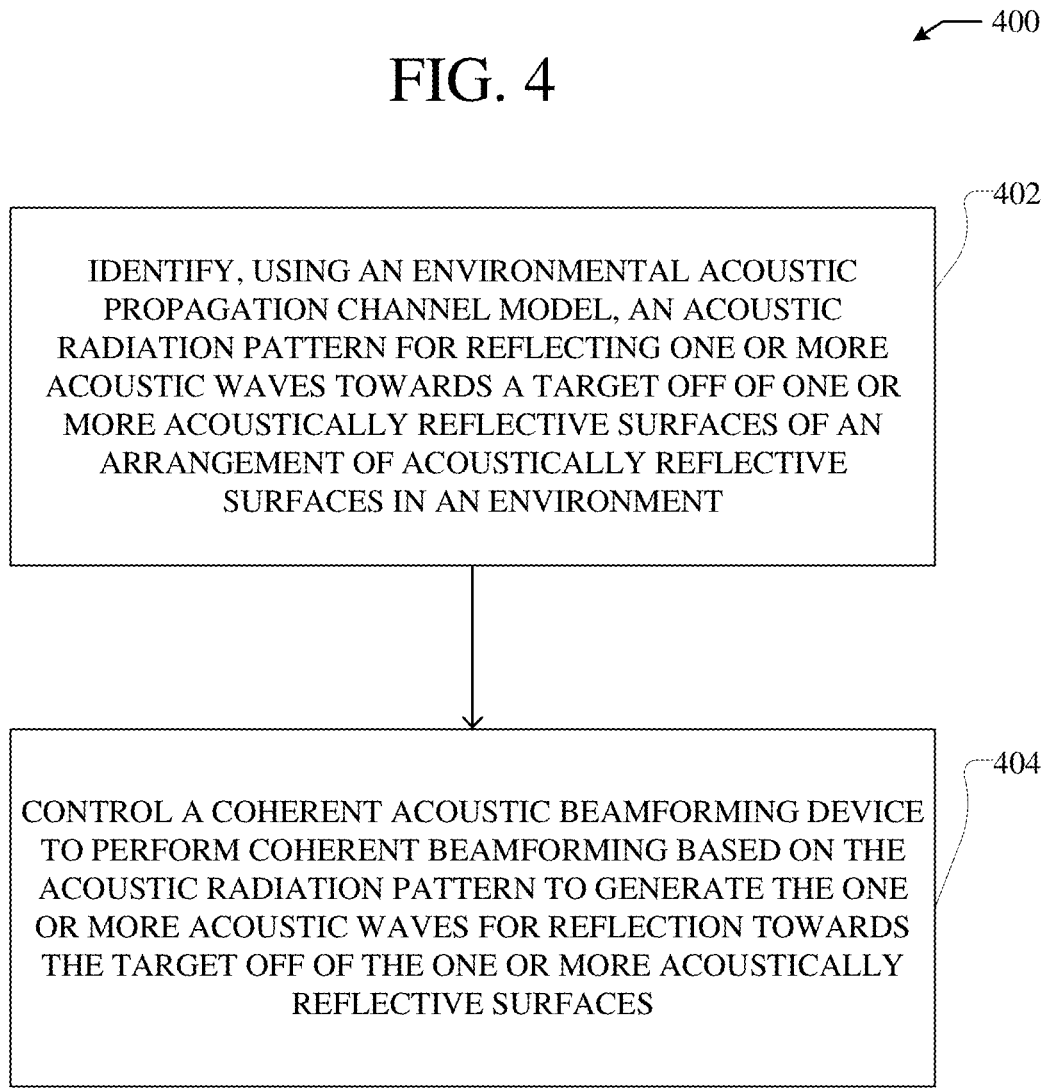
FIG. 4 is a flowchart of an example method of generating acoustic waves for reflection towards a target using an identified environmental acoustic propagation channel model.

FIG. 4 is a flowchart 400 of an example method of generating acoustic waves for reflection towards a target using an identified environmental acoustic propagation channel model. At step 402, an acoustic radiation pattern is identified, using an environmental acoustic propagation channel model, for reflecting one or more acoustic waves towards a target. Specifically, the environmental acoustic propagation channel model can be for one or more acoustically reflective surfaces of an arrangement of acoustically reflective surfaces in an environment of the target.

At step 404, a coherent acoustic beamforming device is controlled to perform coherent beamforming based on the acoustic radiation pattern to generate the one or more acoustic waves. Specifically, the one or more acoustic waves can be generated through acoustic beamforming based on the acoustic radiation pattern to generate the acoustic waves for reflection towards the target off of the one or more acoustically reflective surfaces. More specifically, the acoustic waves can be generated according to the acoustic radiation pattern to reflect the acoustic waves towards the target and deliver haptic feedback to the target.

Figure 5:
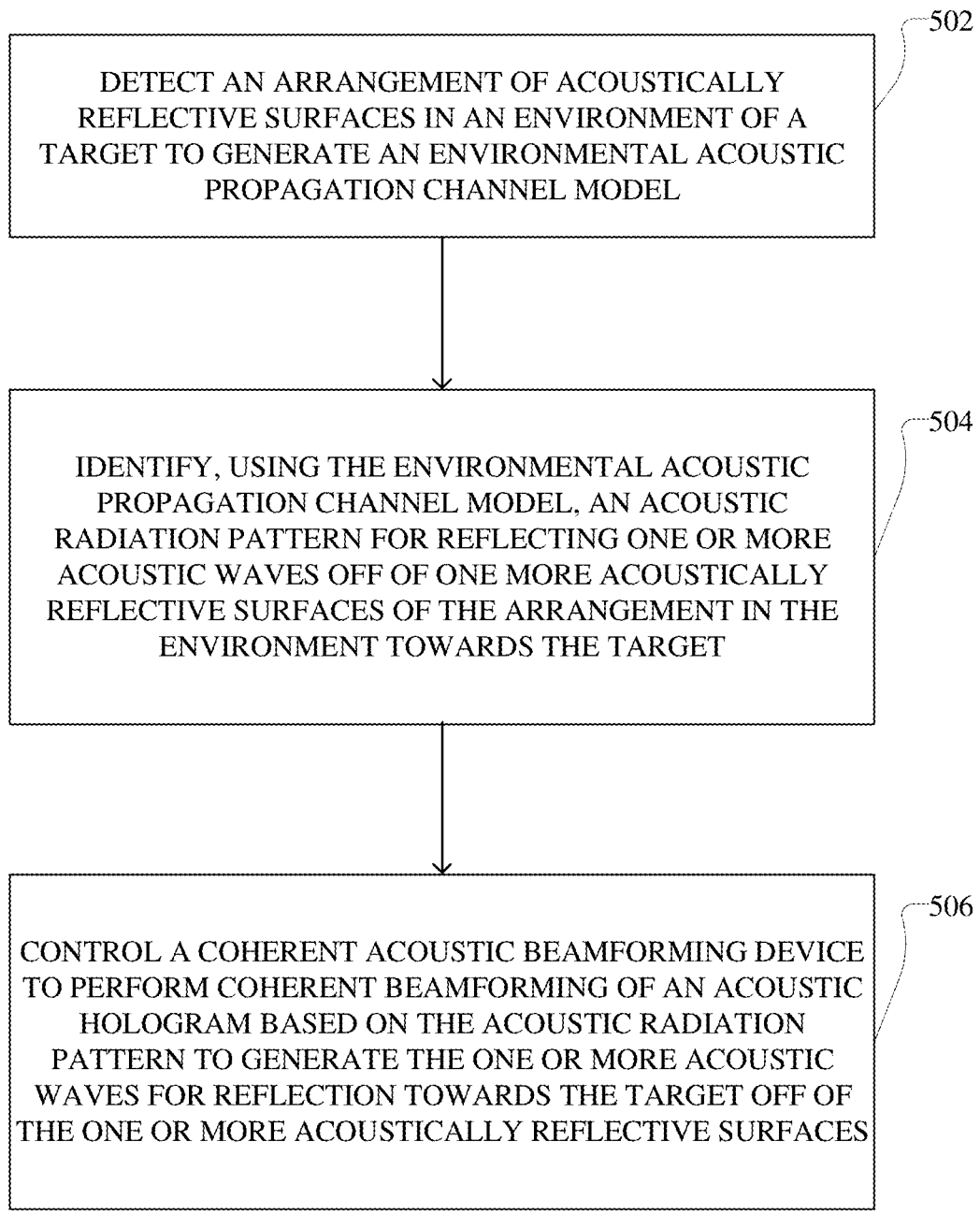
FIG. 5 is a flowchart of an example method of identifying an environmental propagation channel model of an environment and using the model to control transmission of acoustic waves through reflection towards a target in the environment using the model.

FIG. 5 is a flowchart 500 of an example method of identifying an environmental propagation channel model of an environment and using the model to control transmission of acoustic waves through reflection towards a target in the environment using the model. At step 502, an arrangement of acoustically reflective surfaces in an environment of a target is detected to generate an environmental acoustic propagation channel model. The arrangement of acoustically reflective surfaces in the environment can be detected by the transmission control module 206 using the techniques described herein. For example, the arrangement of acoustically reflective surfaces in the environment can be detected by actively tracking the positions and orientations of the acoustically reflective surfaces in the environment. Subsequently, the transmission control module 206 can generate the environmental acoustic propagation channel model based on the arrangement of the acoustically reflective surfaces in the environment. Further, the transmission control module 206 can generate the environmental acoustic propagation channel model based on a position and orientation, e.g. tracked position and orientation, of the target in the environment.

At step 504, an acoustic radiation pattern is identified using the environmental acoustic propagation channel model. Specifically, the transmission control module 206 can identify the acoustic radiation pattern, using the environmental acoustic propagation channel model, for reflecting one or more acoustic waves off of one or more acoustically reflective surfaces in the environment towards the target. More specifically, the transmission control module 206 can identify the acoustic radiation pattern for reflecting acoustic waves towards the target to generate an acoustic hologram at or in the vicinity of the target.

At step 506, a coherent acoustic is controlled to perform coherent beamforming of the one or more acoustic waves, e.g. an acoustic hologram, to generate the one or more acoustic waves for reflection towards the target off of one or more acoustically reflective surfaces. Specifically, the transmission control module 206 can control one or more transducers of the coherent acoustic beamformer 202 to generate the one or more acoustic waves for reflection towards the target. More specifically, the transmission control module 206 can control the transducers based on the acoustic radiation pattern to generate the one or more acoustic waves for reflection towards the target to delivery haptic feedback to the target.

In various embodiments, the systems and devices for providing haptic feedback through acoustic reflection, as described herein, can be implemented as part of a wearable device for a user. Specifically, either or both the coherent acoustic beamformer 202 and the transmission control module 206 can be implemented as part of a wearable device for a user. In being implemented as part of a wearable device of a user, the transmission control module 206 can track a position of the user, e.g. the target, based on a position of the transmission control module 206 while it is worn by the user. For example, the transmission control module 206 when integrated as part of a device worn by a user, can determine its own position and orientation, corresponding to the position and orientation of the user.

Figure 6:
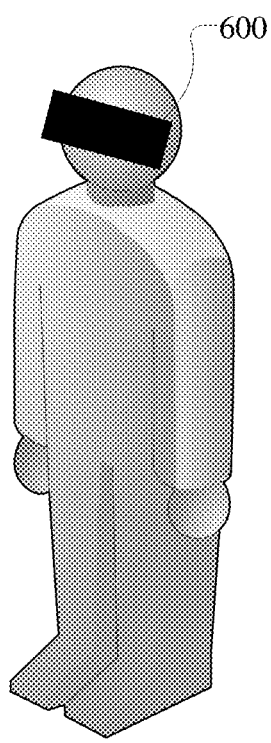
FIG. 6 shows an example of a coherent beamforming device for providing haptic feedback to a user through acoustic reflection integrated as part of a head-worn device of the user.

FIG. 6 shows an example of a coherent beamforming device 600 for providing haptic feedback to a user through acoustic reflection integrated as part of a head-worn device of the user. The coherent beamforming device 600 can be integrated as part of an applicable head-worn device, e.g. for providing an interactive experience to the user. For example, the coherent beamforming device 600 can be implemented as part of augmented reality glasses or virtual reality glasses worn by the user. The head-worn device can provide visual display, e.g. as part of an interactive experience, to the user. Further, the coherent beamforming device 600 integrated as part of the head-worn device can provide haptic feedback, e.g. in association with the provided visual display, to the user to enhance the interactive experience for the user. Specifically, the coherent beamforming device 600, while worn by the user, can use acoustic reflection to transmit acoustic waves to a hand of the user to provide haptic feedback and enhance the interactive experience for the user.

Figure 7:
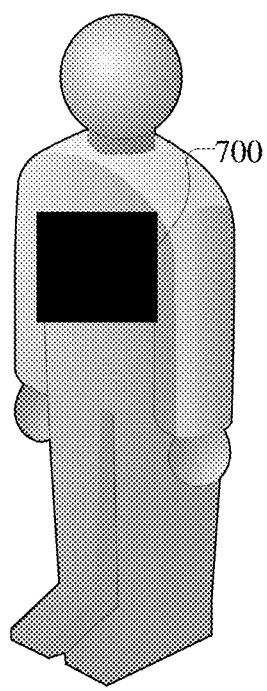
FIG. 7 shows an example of a coherent beamforming device for providing haptic feedback to a user through acoustic reflection integrated as part of a body-worn vest of the user.

FIG. 7 shows an example of a coherent beamforming device 700 for providing haptic feedback to a user through acoustic reflection integrated as part of a body-worn vest of the user. In being integrated as part of a body-worn vest of the user, the coherent beamforming device 700 can provide haptic feedback to the user through reflection while the user moves through an environment.

Figure 8:
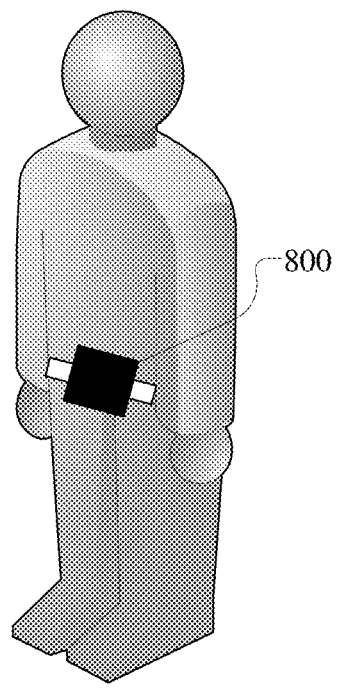
FIG. 8 shows an example of a coherent beamforming device for providing haptic feedback to a user through acoustic reflection integrated as part of a belt-worn case of the user.

FIG. 8 shows an example of a coherent beamforming device 800 for providing haptic feedback to a user through acoustic reflection integrated as part of a belt-worn case of the user. In being integrated as part of a belt-worn case of the user, the coherent beamforming device 800 can provide haptic feedback to the user through reflection while the user moves through an environment.

In various embodiments, the systems and devices for providing haptic feedback through acoustic reflection, as described herein, can be encapsulated in an acoustic enclosure, e.g. attached to a display. Specifically, either or both the coherent acoustic beamformer 202 and the transmission control module 206 can be encapsulated in an acoustic enclosure attached to a display.

In various embodiments, the systems and devices for providing haptic feedback through acoustic reflection, as described herein, can be integrated with a keyboard. Specifically, either or both the coherent acoustic beamformer 202 and the transmission control module 206 can be integrated as part of a keyboard to provide haptic feedback through reflection when a user interacts with the keyboard.

In various embodiments, the systems and devices for providing haptic feedback through acoustic reflection, as described herein, can be associated with a handheld device or with an extension of a handheld device. Specifically, either or both the coherent acoustic beamformer 202 and the transmission control module 206 can be integrated with a handheld device or with an extension of a handheld device, e.g. a battery case for the handheld device.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

What is claimed is:

1. A method of forming acoustic holograms in a region aided by reflection from environmental objects comprising:
   detecting an arrangement of acoustically reflective surfaces in an environment of a target to generate an environmental acoustic propagation channel model;
   identifying, using the environmental acoustic propagation channel model, an acoustic radiation pattern for reflecting one or more acoustic waves off of one or more acoustically reflective surfaces of the arrangement of acoustically reflective surfaces in the environment towards the target; and
   controlling a coherent acoustic beamforming device to perform coherent beamforming of an acoustic hologram based on the acoustic radiation pattern to generate the one or more acoustic waves for reflection towards the target off of the one or more acoustically reflective surfaces.

2. The method of claim 1, wherein the acoustic waves comprise narrowband acoustic waves.

3. The method of claim 1, wherein the acoustic waves comprise ultrasonic waves with frequencies greater than 30 kHz.

4. The method of claim 1, wherein the arrangement of the acoustically reflective surfaces includes positions of the acoustically reflective surfaces in the environment and the environmental acoustic propagation channel model is generated based on the positions of the acoustically reflective surfaces in the environment.

5. The method of claim 1, wherein the arrangement of the acoustically reflective surfaces includes orientations of the acoustically reflective surfaces in the environment and the environmental acoustic propagation channel model is generated based on the orientations of the acoustically reflective surfaces in the environment.

6. The method of claim 1, wherein the environmental acoustic propagation channel model is generated based on coherent acoustic beamforming properties of the acoustically reflective surfaces in the environment.

7. The method of claim 1, wherein positions and orientations of the acoustically reflective surfaces in the environment, as part of the arrangement of the acoustically reflective surfaces in the environment, are previously known and the environmental acoustics propagation channel model is generated based on established positions and orientations of the acoustically reflective surfaces in the environment.

8. The method of claim 1, further comprising:
   actively determining positions and orientations of the acoustically reflective surfaces in the environment, as part of detecting the arrangement of the acoustically reflective surfaces in the environment; and
   generating the environmental acoustic propagation channel model based on the actively determined positions and orientations of the acoustically reflective surfaces in the environment.

9. The method of claim 8, wherein the positions and orientations of the acoustically reflective surfaces in the environment are actively determined using an acoustic ranging or tracking technique.

10. The method of claim 8, wherein the positions and orientations of the acoustically reflective surfaces in the environment are actively determined using an optical ranging or tracking device.

11. The method of claim 8, wherein the positions and orientations of the acoustically reflective surfaces in the environment are actively determined using at least one of mmWave ranging, tracking, or imaging.

12. The method of claim 8, wherein the positions and orientations of the acoustically reflective surfaces in the environment are actively determined using radar.

13. The method of claim 8, wherein the positions and orientations of the acoustically reflective surfaces in the environment are actively determined using infrared imaging.

14. The method of claim 1, wherein the environmental acoustic propagation channel model is generated based on a position and an orientation of the target in the environment.

15. The method of claim 14, wherein the environmental acoustic propagation channel model is generated based on a position and an orientation of the target with respect to at least a portion of the acoustically reflective surfaces of the arrangement of acoustically reflective surfaces in the environment.

16. The method of claim 14, wherein the position and the orientation of the target in the environment is previously known and the environmental acoustics propagation channel model is generated based on an established position and orientation of the target in the environment, and wherein the target remains stationary in the environment.

17. The method of claim 14, further comprising:
actively determining a position and orientation of the target in the environment; and
generating the environmental acoustic propagation channel model based on the actively determined position and orientation of the target in the environment.

18. The method of claim 17, wherein the position and the orientation of the target in the environment are actively determined based on the target moving in the environment.

19. The method of claim 1, wherein the environmental acoustic propagation channel model is generated using ray acoustics.

20. The method of claim 1, wherein the environmental acoustic propagation channel model is generated using acoustic beam propagation modeling.

21. The method of claim 1, wherein the environmental acoustic propagation channel model is generated using wave acoustics.

22. The method of claim 1, wherein the environmental acoustic propagation channel model includes diffractive effects, including scattering off edges and other subwavelength features.

23. A system for transmitting acoustic waves in a region aided by reflection from environmental objects comprising:
a transmission control module configured to:
detect an arrangement of acoustically reflective surfaces in an environment of a target to generate an environmental acoustic propagation channel model;
identify, using the environmental acoustic propagation channel model, an acoustic radiation pattern for reflecting one or more acoustic waves off of one or more acoustically reflective surfaces of the arrangement of acoustically reflective surfaces in the environment towards the target; and
one or more transducers of a coherent acoustic beamforming device configured to perform coherent beamforming based on the acoustic radiation pattern to generate the one or more acoustic waves for reflection towards the target off of the one or more acoustically reflective surfaces.

24. The system of claim 23, wherein the acoustic waves comprise narrowband acoustic waves.

25. The system of claim 23, wherein the acoustic waves comprise ultrasonic waves with frequencies greater than 30 kHz.

26. The system of claim 23, wherein the arrangement of the acoustically reflective surfaces includes positions of the acoustically reflective surfaces in the environment and the environmental acoustic propagation channel model is generated based on the positions of the acoustically reflective surfaces in the environment.

27. The system of claim 23, wherein the arrangement of the acoustically reflective surfaces includes orientations of the acoustically reflective surfaces in the environment and the environmental acoustic propagation channel model is generated based on the orientations of the acoustically reflective surfaces in the environment.

28. The system of claim 23, wherein the environmental acoustic propagation channel model is generated based on coherent acoustic beamforming properties of the acoustically reflective surfaces in the environment.

29. The system of claim 23, wherein positions and orientations of the acoustically reflective surfaces in the environment, as part of the arrangement of the acoustically reflective surfaces in the environment, are previously known and the environmental acoustics propagation channel model is generated based on established positions and orientations of the acoustically reflective surfaces in the environment.

30. The system of claim 23, further comprising:
actively determining positions and orientations of the acoustically reflective surfaces in the environment, as part of detecting the arrangement of the acoustically reflective surfaces in the environment; and
generating the environmental acoustic propagation channel model based on the actively determined positions and orientations of the acoustically reflective surfaces in the environment.

31. The system of claim 30, wherein the positions and orientations of the acoustically reflective surfaces in the environment are actively determined using an acoustic ranging or tracking technique.

32. The system of claim 30, wherein the positions and orientations of the acoustically reflective surfaces in the environment are actively determined using an optical ranging or tracking device.

33. The system of claim 30, wherein the positions and orientations of the acoustically reflective surfaces in the environment are actively determined using at least one of mmWave ranging, tracking, or imaging.

34. The system of claim 30, wherein the positions and orientations of the acoustically reflective surfaces in the environment are actively determined using radar.

35. The system of claim 30, wherein the positions and orientations of the acoustically reflective surfaces in the environment are actively determined using infrared imaging.

36. The system of claim 23, wherein the environmental acoustic propagation channel model is generated based on a position and an orientation of the target in the environment.

37. The system of claim 36, wherein the environmental acoustic propagation channel model is generated based on a position and an orientation of the target with respect to at least a portion of the acoustically reflective surfaces of the arrangement of acoustically reflective surfaces in the environment.

38. The system of claim 36, wherein the position and the orientation of the target in the environment is previously known and the environmental acoustics propagation channel model is generated based on an established position and orientation of the target in the environment, and wherein the target remains stationary in the environment.

39. The system of claim 36, wherein the transmission control module is further configured to:
actively determine a position and orientation of the target in the environment; and
generate the environmental acoustic propagation channel model based on the actively determined position and orientation of the target in the environment.

40. The system of claim 39, wherein the position and the orientation of the target in the environment are actively determined based on the target moving in the environment.

41. The system of claim 23, wherein the environmental acoustic propagation channel model is generated using acoustic beam propagation modeling.

42. The system of claim 23, wherein the environmental acoustic propagation channel model is generated using wave acoustics.

43. The system of claim 23, wherein the environmental acoustic propagation channel model includes diffractive effects, including scattering off edges and other subwavelength features.

* * * * *